US006562246B2

United States Patent
McGowan

(10) Patent No.: US 6,562,246 B2
(45) Date of Patent: May 13, 2003

(54) PRESSURIZED BACKFLUSH SYSTEM

(75) Inventor: David R. McGowan, Lake George, NY (US)

(73) Assignee: Kadant Inc., Acton, MA (US)

( * ) Notice: Subject to any disclaimer, the term of this patent is extended or adjusted under 35 U.S.C. 154(b) by 0 days.

(21) Appl. No.: 09/943,716

(22) Filed: Aug. 31, 2001

(65) Prior Publication Data

US 2003/0042184 A1 Mar. 6, 2003

(51) Int. Cl.[7] .............................................. B01D 37/00
(52) U.S. Cl. ...................... 210/791; 210/108; 210/141; 210/411; 210/412; 55/302
(58) Field of Search .............................. 210/87, 90, 108, 210/141, 143, 321.69, 333.01, 411, 412, 418, 420, 422, 427, 636, 791, 798; 95/278–280; 55/302

(56) References Cited

U.S. PATENT DOCUMENTS

| 5,032,287 A | | 7/1991 | Salmond ...................... 210/427 |
| 5,047,154 A | * | 9/1991 | Comstock et al. ..... 210/321.69 |
| 5,128,107 A | * | 7/1992 | Katoh et al. ................. 210/411 |
| 5,234,605 A | * | 8/1993 | Reipur et al. .......... 210/333.01 |
| 5,374,351 A | | 12/1994 | Bolton et al. ................ 210/411 |
| 5,512,167 A | * | 4/1996 | Gramms et al. ............. 210/412 |
| 5,769,539 A | * | 6/1998 | Tsang et al. ................. 210/636 |
| 5,846,420 A | | 12/1998 | Bolton et al. ................ 210/412 |

FOREIGN PATENT DOCUMENTS

| DE | 198 10 518 A | 9/1999 |
| FR | 2 586 202 A | 2/1987 |

* cited by examiner

Primary Examiner—Joseph W. Drodge
(74) Attorney, Agent, or Firm—Frommer Lawrence & Haug LLP; Ronald R. Santucci

(57) ABSTRACT

A filter backflushing system including an accumulator containing a pressurized bladder which propels a supply of backwash fluid contained within the accumulator in a reverse direction through a filter element. While the backwash fluid is pumped within the accumulator, an inert gas inside the bladder is compressed against the inside walls of the accumulator. Upon reaching a pressure of approximately 300–600 psi, the filtered fluid is released from the accumulator and the full energy of the compressed gas is released as well. This release produces a high pressure rapid burst of backwash fluid which effectively removes clogging contaminants from a filter element.

11 Claims, 3 Drawing Sheets

PRESSURIZED BACKFLUSH SYSTEM

BACKGROUND OF THE INVENTION

1. Field of the Invention

The present invention relates to a filtering system and, more particularly, to a filter backflushing system for removing contaminants from a filter element, the backflushing system includes a bladdered accumulator for providing a high pressure rapid burst of backflush fluid stored within the accumulator in a reverse flow through the filter element.

2. Brief Description of the Prior Art

A filtered supply of a coolant, lubricant, fuel, water or other fluid is oftentimes essential for the proper operation and maintenance of a multitude of industrial automotive and commercial systems. Unfortunately, the filter elements utilized to filter such fluids must be periodically replaced or cleansed to remove a clogging accumulation of contaminants and foreign matter therefrom.

The periodic removal and replacement of a clogged filter element generally requires the shutting down of an associated system during the replacement procedure. The expensive, nonproductive downtime of the filtration and associated systems, the replacement cost of the filter element and the expenses incurred to properly dispose of the soiled filter element and the contents thereof in accordance with the ever increasing degree of governmental and environmental mandates, have led to the development of numerous integrated filter element cleansing systems.

One type of integrated system, generally termed backflushing or backwashing, generates a reverse flow of fluid through individual filter elements to dislodge the contaminants therefrom, wherein the backflushing fluid has been filtered by a singular filter or multiple filters. Advantageously, backflushing reduces the operational cost of filtering and associated systems by extending the usable life of the filter elements, by reducing the systems' downtime required to replace filter elements and by reducing disposal costs.

In U.S. Pat. No. 5,374,351, a filter backflushing system is provided. The filtration system includes either a pneumatically-driven piston or pneumatic accumulator for propelling a high pressure backflush fluid through the system in a reverse direction. This reverse backflush flow then removes contaminants from a filter element. An external pneumatic system provides replenishing air pressure to the piston or accumulator, allowing its continued operation. Air replenishment is needed in non-pistoned accumulators because in the accumulator pressurized air becomes entrained with the backflushing fluid and this pressurized air is lost during the backflushing operation. In a pistoned accumulator, replenishment is needed to repressurize the piston chamber and replace any air which blows by the piston area, thus becoming entrained in the backflushing fluid. Similarly, in U.S. Pat. No. 5,846,420, an external pneumatic system provides replenishment air pressure to a piston arrangement, allowing a pressurized backflushing operation. While such systems work very satisfactorily, there is always a desire to improve upon their operation.

In this regard there is a desire to eliminate the requirement for a separate air replenishment system supporting the backflushing operation. Also, there is a desire to eliminate the possibility of entrained air in the backwash fluid. By doing so, the backwashed filters will not be exposed to a fluid composition not normally used in regular operations.

SUMMARY OF THE INVENTION

An object of the present invention is to provide a filter backflushing system having a bladder-type accumulator which supplies a short duration, high intensity backflushing flow through a filter element.

A further object of the present invention is to provide a filter backflushing system which supplies a regulated backflushing flow through a filter element.

A still further object of the present invention is to provide a filter backflushing system which is highly suited for effectively and efficiently removing contaminants in virtually any type of filtration system.

A still further object of the present invention is to provide a self-contained filter backflushing system independent of an air or pressurized replenishment system.

A still further object of the present invention is to provide a filter backflushing system which uses filtered fluid in a backflushing operation.

A still further object of the present invention is to provide a filter backflushing system which can also use a specialized backflush material for specific applications.

To attain these objectives, there is provided a filter backflushing system which includes a filter housing enclosing a removable filter element, a valve controlled feed pipe for introducing an unfiltered fluid into the filter housing, a valve controlled output feed pipe for removing filtered fluid from the filter housing, a backflushing fluid accumulator enclosing a bladder which stores a portion of the filtered fluid, an accumulator charging pump for providing pressurized filtered fluid from a portion of the outlet feed pipe to the accumulator, and an actuator responsive to system fluid pressure.

The bladder of the accumulator containing backflushing liquid is effectively isolated by a membrane which contains a compressible inert gas in the remaining volume of the backflush fluid accumulator. Preferably, the minimum bladder volume of the backflushing fluid accumulator is substantially equivalent to the filter housing volume, thus allowing the clean, filtered fluid contained within the backflushing fluid accumulator to completely displace the fluid within the filter housing during the backflushing operation. A complete displacement would substantially remove all of the flow reducing contaminants and foreign matter which have clogged the filter element.

In response to an actuating signal, the bladder can rapidly de-compress within the interior of the backflushing fluid accumulator. This rapid de-compression, assisted by the compressed inert gas between the membrane of the bladder and the interior accumulator wall, propels the filtered fluid contained within the accumulator in a reverse direction through the filtering system. The compression force of the bladder produces a high, constant fluid pressure within the filter backflushing system which effectively backflushes the filter element. The backflushing flow may be regulated in accordance with the requirements of the filter, the types of fluids flowing through the filtration system or other parameters. In particular, the backflushing flow intensity may be regulated by altering the relative expansion capacity of the bladder, use of restrictive flow orifices in the backflush feed pipe varying the output pressure of the accumulator charging pump, or adjusting the actuation signal.

The direction of fluid flow through the filter backflushing system is controlled by a plurality of suitably positioned pneumatically controlled valves. In particular, the accumulator pump input and output feed pipes for isolating the accumulator pump, the feed pipe for inputting the solid/fluid mixture into the interior of the filter element, the backwash feed pipe for supplying backwash fluid from the accumulator to the filter element, the outlet feed pipe for discharging filtered fluid from the filter element and the drain output for removing fluid from the filter housing, each include a valve which is adapted to selectively shut off or enable the flow of fluid therethrough during the normal filtering and backflushing operations of the filter backflushing system.

During normal filtration, a solid/fluid mixture enters the filter element through the input feed pipe, thereby allowing the solid and fluid mixture to be separated by the filter element. The filtered fluid enters the output feed pipe disposed proximate the top of the filter housing. The filtered fluid contained within the output feed flows on to systems supported by the filtration system. A small portion of the filtered fluid branches off the output feed and is further pressurized by the accumulator charging pump. The accumulator charging pump discharges the pressurized filtered fluid to the backflushing fluid accumulator compressing the bladder contained within.

During the backflushing operation, the direction of fluid flow is reversed in regard to the filtration mode. First, the accumulator charging pump input, the accumulator charging pump output, the output feed pipe, and feed pipe control valves are closed simultaneously or in rapid succession. The accumulator charging pump is deactivated immediately before or after the valve closure. Subsequently, the drain output control valve and backflush feed control valve are opened, allowing the backflushing fluid to flow from the bladder of the accumulator onto the filter housing in a purging action. Once the bladder reaches the end of its capacity or the pressure of the backflush feed decreases to a preset point, the drain output control valve and backflush feed control valve are closed. The output feed pipe, feed pipe accumulator charging pump input, and accumulator charging pump output control valves are then reopened. Upon activation of the accumulator charging pump the system is returned to a condition for a normal filtering operation.

BRIEF DESCRIPTION OF THE DRAWINGS

Thus by the present invention its objects and advantages will become readily apparent upon reading the following detailed description of the invention in conjunction with the accompanying drawings, in which.

DETAILED DESCRIPTION OF THE PREFERRED EMBODIMENTS

Figure 1:
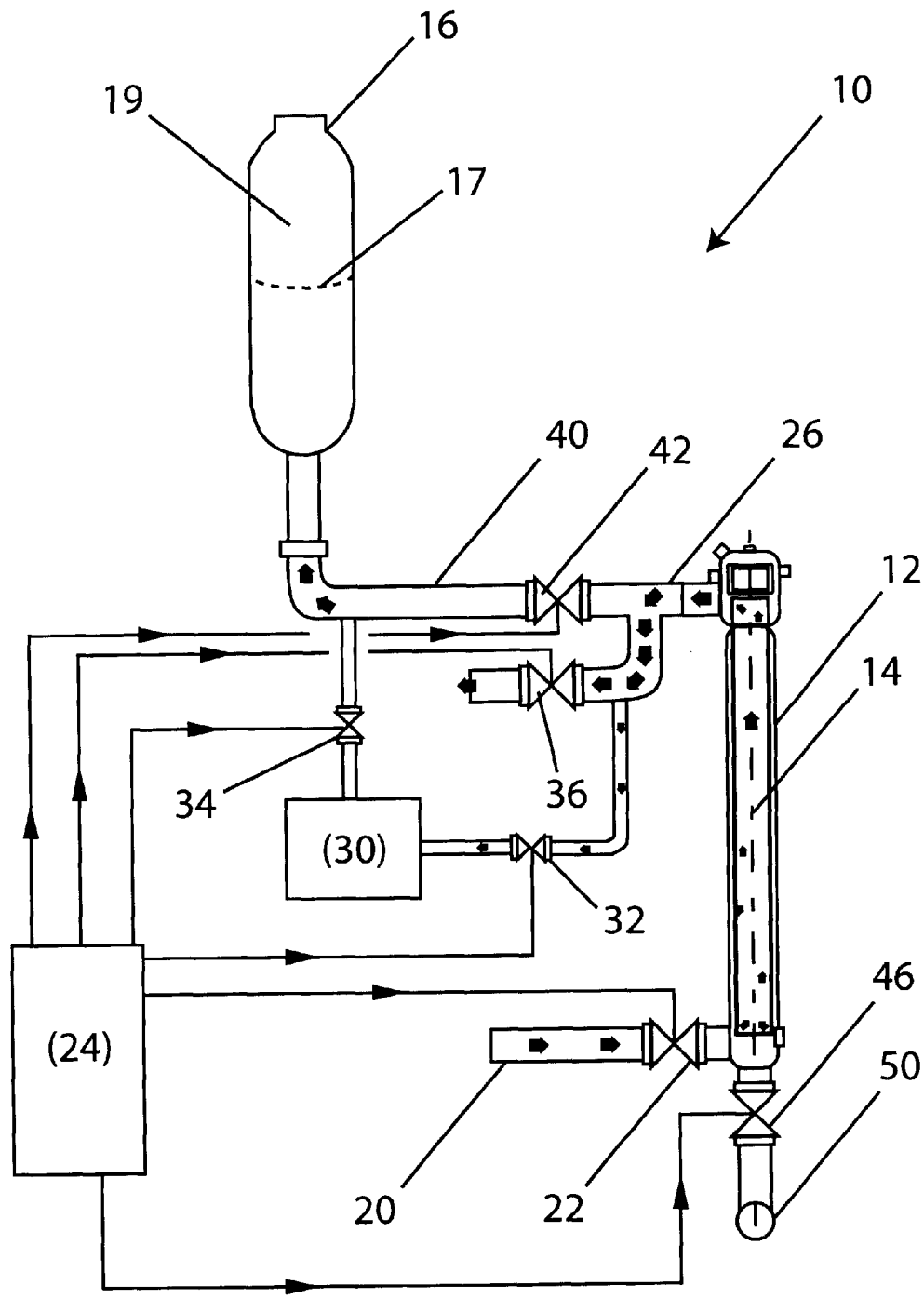
FIG. 1 depicts a pressurized backflushing system in a filtration mode.

Referring now specifically to the drawings, wherein like reference numerals refer to like elements throughout the several views, one sees that FIG. 1 depicts a pressurized backflush system in a normal filtration mode.

As illustrated in FIG. 1, the pressurized backflushing system 10 generally includes a filter housing 12 with a filter element 14 enclosed therein and a backflushing fluid accumulator 16 with a bladder 17 enclosed therein. Feed pipe 20 is provided for introducing a supply of solid/fluid mixture into the interior of filter element 14. A pneumatically-controlled valve 22 is utilized to shut off or regulate the flow of the solid/fluid mixture through feed pipe 20, in accordance with a signal provided by pneumatic control panel 24. Pneumatically-controlled valve 22 and other pneumatically-controlled valves listed below are used in the pressurized backflush system described; however, other types of automatically operated valves known to those skilled in the art may be used.

After filtration in filter element 14, the filtered fluid flows out of the top of the filter housing 12, through an output feed pipe 26. A small portion of the filtered fluid enters a pump input feed pipe 28 which supplies filtered fluid to accumulator charging pump 30. Pneumatically-controlled valves 32,34 are utilized to shut off or regulate the flow of filtered fluid to accumulator charging pump 30 in accordance with a signal provided by pneumatic control panel 24. Valve 36 is utilized to shut off or regulate the flow of filtered fluid to outside systems also in accordance with a signal provided by the pneumatic control panel 24.

Accumulator charging pump 30 discharges pressurized filtered fluid to backflushing fluid accumulator 16. Bladder 17 of backflushing accumulator 16 can preferably contain a volume of compressed gas substantially equal to the volume of fluid contained in filter housing 12. Between the interior of accumulator housing 16 and the bladder 17, a volume 19 of inert gas compresses as accumulator 16 stores pressurized filtered fluid. Membrane 17, which is preferably made of rubberized material but may be made of any other material known to those skilled in the art, effectively isolates the backflushing fluid from volume 19. This isolation prevents any air or inert gas from entering the backflushing system.

Figure 2:
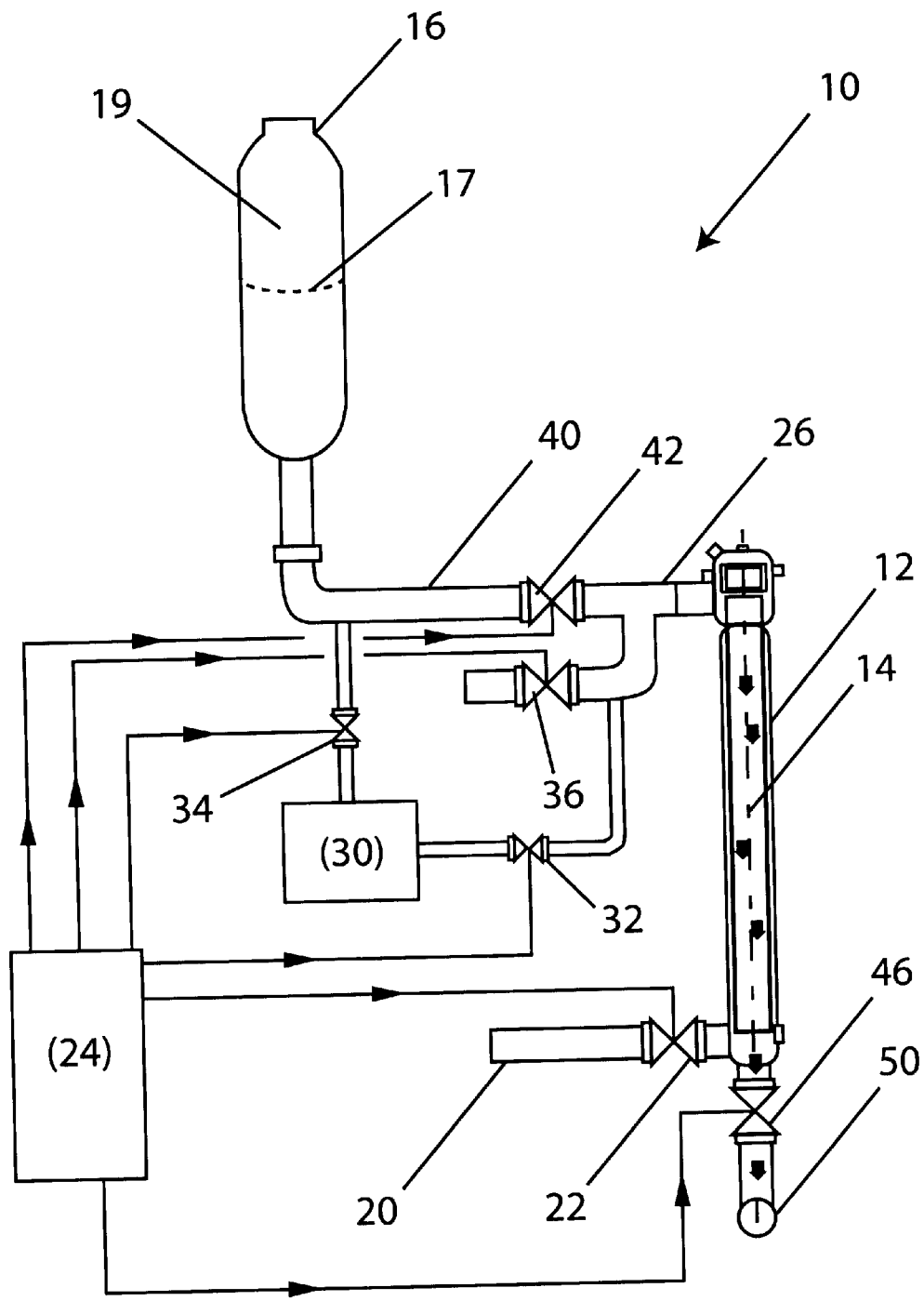
FIG. 2 depicts a pressurized backflushing system in a filter housing draining mode.

FIG. 2 depicts the pressurized backflushing system in a filter housing draining mode. The filter housing draining mode is an operation that can be performed prior to backflushing. The draining of filter housing 12 is not required prior to backflushing; however, the effectiveness of backflushing can be enhanced by pre-draining. In the figure, filter housing 12 is isolated from the feed and discharge systems by closing valves 22 and 36. Immediately before or immediately after the closing of valves 22 and 36, valves 34 and 42 are closed and accumulator charging pump 30 may be deactivated. Pneumatically controlled drain output valve 46 is then opened, allowing fluid contained in filter housing 12 to discharge through drain output 50.

Figure 3:
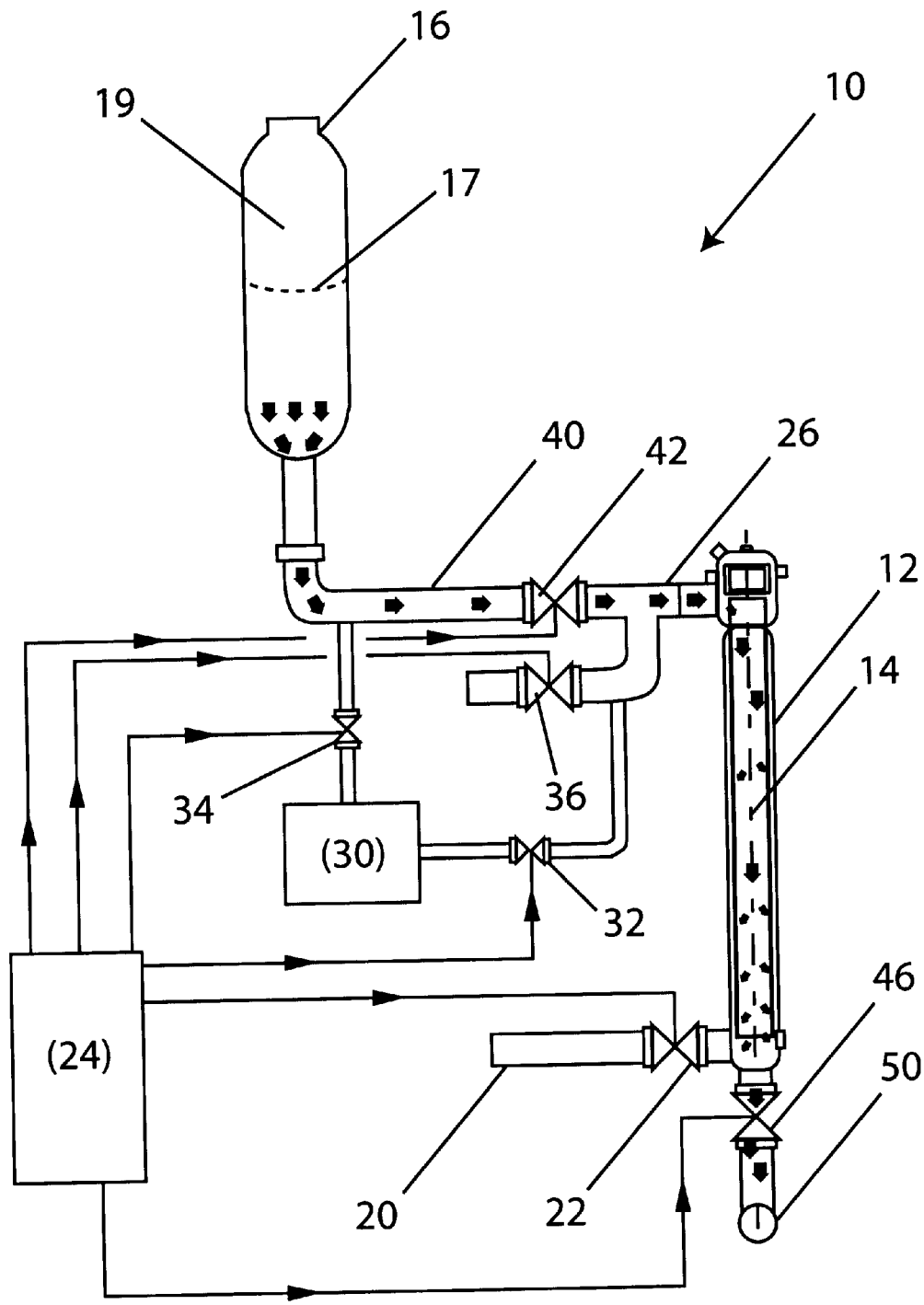
FIG. 3 depicts a pressurized backflushing system in a backflush mode.

FIG. 3 depicts the pressurized backflushing system in a backflush mode. In the figure, bladder 17 is ready to propel the accumulator's supply of pressurized filtered fluid through backflush feed pipe 40 and output feed pipe 26, into filter housing 12 and through filter element 14 in a reverse direction to the filtration mode. This propulsion of backflushing fluid dislodges contaminants suspended on filter element 14, allowing their flow through drain output valve 46 and drain piping 50.

In the sequencing of the backflushing operation, accumulator charging pump 30 is deactivated. Immediately before or after the deactivation, valve 42 and drain output valve 46 are opened while valves 22, 32, 34, 36 are closed, thereby creating a fluid path from accumulator 16 through backflush feed pipe 40, output feed pipe 26, and onto filter element 14. Bladder 17, assisted in its release by the expansion of volume 19 of compressed inert gas, releases its stored backflush fluid in a method described above. After reaching an expanded state, or upon an actuation signal, bladder 17 of backflushing fluid accumulator 16 is again ready for repressurization from accumulator charging pump 30. At this point, valve 42 and drain output valve 46 are closed and valves 22, 32, 34, 36, 42 are reopened. Accumulator charging pump 30 is re-activated, returning to replenishing bladder 17 with the filtration system returning to a normal filtering operation.

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, the present invention may be utilized to sequentially backflush each of the individual filter units in a multiple filter system. Such modifications and variations that may be apparent to a person skilled in the art are intended to be included within the scope of this invention as defined by the accompanying claims.

I claim:

1. A pressurized backflushing apparatus comprising:
   a filtering system including a filter housing containing a filter member therein, an input feed for introducing an unfiltered fluid into said filter housing, an output feed for removing filtered fluid from said filter housing, a backflush feed for introducing backflushing fluid into said filter housing, and a drain output for removing said backflushing fluid;
   an accumulator charging pump which receives a portion of said filtered fluid, said accumulator charging pump producing a pressurized discharge of said filtered fluid;
   an accumulator including an input port for receiving the filtered fluid from said accumulator charging pump discharge, a compressible inert gas section with a bladder to isolate said inert gas section, storing said filtered fluid to a pressure of approximately 300–600 psi such that the filtered fluid is propelled upon release from the accumulator through the backflush feed and the output feed into said filter housing, and through said filter member and out said drain output, thereby backflushing said filter member during a backflushing operation;
   backflush feed valve means for controlling the flow of said backflushing fluid out of said accumulator through said backflush feed;
   pump input feed valve means for controlling the flow of said filtered fluid into said accumulator charging pump;
   pump output feed valve means for controlling the flow of said pressurized discharge out of said accumulator charging pump;
   input feed valve means for controlling the flow of said unfiltered fluid into said filter housing through said input feed;
   drain output valve means for controlling the removal of said backflushing fluid through said drain output;
   output feed valve means for controlling the flow of said filtered output of said filter housing through said output feed and;
   means for sequencing the actuation of said accumulator, said accumulator charging pump, said backflush valve means, said pump input feed valve means, said pump output feed valve means, said input feed valve means, said drain output valve means and said output feed valve means during a backflushing operation.

2. The filter backflushing apparatus according to claim 1 wherein, during said backflushing operation, said sequencing means is adapted to de-energize said accumulator charging pump and to close said pump input feed valve means, said pump output feed valve means, said input feed valve means and said output feed valve means, and to open said drain output valve means and said backflush feed valve means.

3. The filter backflushing apparatus according to claim 1 wherein, during said backflushing operation, said sequencing means is adapted to de-energize said accumulator pump and to close said pump input valve means said pump output valve means, said input feed valve means and said output feed valve means, and to open said drain output valve means and then opening said backflush feed valve means after a period substantially equal to the draining time of said filter housing.

4. The filter backflushing apparatus according to claim 1 wherein, during a filtering operation of said filtering system, said sequencing means is adapted to close said drain output valve means and said backflush feed valve means, and to open said input feed valve means, said pump input feed valve means, said pump output feed valve means and said output feed valve means remaining in an open state.

5. The filter backflushing apparatus according to claim 1 wherein said sequencing means further includes means for initiating said backflushing operation.

6. The filter backflushing apparatus according to claim 5 wherein said initiating means are actuated at a set pressure.

7. The filter backflushing apparatus according to claim 5 wherein said backflushing operation initiating means includes means for monitoring the fluid flow through said filter member.

8. The filter backflushing apparatus according to claim 5 wherein said backflushing operation initiating means includes means for monitoring the pressure in said accumulator.

9. The filter backflushing apparatus according to claim 1 wherein a volume of said bladder of said accumulator is substantially equivalent to or more than a volume of said filter housing.

10. A method of pressurized backflushing of a filtration system, said method comprising the steps of:
    providing the apparatus of claim 1;
    deactivating said accumulator charging pump;
    actuating in a simultaneous manner the pump output feed valve means, the pump input feed valve means, the input feed valve means and the output feed valve means such that each is in a closed state;
    actuating the backflush feed valve means and the drain output valve means such that each valve is in an open state;
    releasing said backwashing fluid stored within said accumulator; and
    propelling said backwashing fluid through said filter member and onto said drain output with the result of a backflushed filtration system.

11. A method of pressurized backflushing of a filtration system, said method comprising the steps of:
    providing the apparatus of claim 1;
    deactivating said accumulator charging pump;
    activating the input feed valve means, the output feed valve means, the pump output feed valve means, and the pump input feed valve means such that each is in a closed state;
    releasing said backwash fluid stored within said bladder;
    propelling said backwash fluid through said filter member and onto said drain output with the result of a backflushed filtration system.

* * * * *